United States Patent
Brennan et al.

(10) Patent No.: US 10,782,441 B2
(45) Date of Patent: Sep. 22, 2020

(54) MULTIPLE THREE-DIMENSIONAL (3-D) INSPECTION RENDERINGS

(71) Applicant: Analogic Corporation, Peabody, MA (US)

(72) Inventors: Kevin Brennan, Middleton, MA (US); William Davidson, North Reading, MA (US); Patrick Splinter, Middleton, MA (US)

(73) Assignee: Analogic Corporation, Peabody, MA (US)

( * ) Notice: Subject to any disclaimer, the term of this patent is extended or adjusted under 35 U.S.C. 154(b) by 0 days.

(21) Appl. No.: 15/496,162

(22) Filed: Apr. 25, 2017

(65) Prior Publication Data

US 2018/0308255 A1 Oct. 25, 2018

(51) Int. Cl.
*G01V 5/00* (2006.01)
*G06T 19/00* (2011.01)
*G06T 11/00* (2006.01)

(52) U.S. Cl.
CPC ............. *G01V 5/005* (2013.01); *G06T 19/00* (2013.01); *G06T 11/001* (2013.01); *G06T 2219/028* (2013.01)

(58) Field of Classification Search
CPC ................... G06T 7/0004; G06T 7/90; G06T 2207/10081; G06T 7/0006; G06T 2207/30112; G06T 2207/10116; G06T 2207/30128; G01V 5/0008; G01V 5/005
See application file for complete search history.

(56) References Cited

U.S. PATENT DOCUMENTS

| | | | |
|---|---|---|---|
| 7,072,434 B1 | 7/2006 | Tybinkowski | |
| 7,190,757 B2 | 3/2007 | Ying | |
| 7,302,083 B2 | 11/2007 | Larson | |
| 8,787,669 B2 | 7/2014 | Litvin | |
| 2002/0109684 A1* | 8/2002 | Repin | G01V 1/34 345/424 |
| 2003/0095630 A1* | 5/2003 | Avinash | A61B 6/405 378/98.9 |
| 2004/0062346 A1* | 4/2004 | Fernandez | G01V 5/0058 378/41 |
| 2005/0276443 A1* | 12/2005 | Slamani | G06K 9/00208 382/103 |
| 2006/0008140 A1* | 1/2006 | Imamura | G06K 9/34 382/164 |
| 2006/0104414 A1* | 5/2006 | Mayo | G01N 23/20 378/57 |

(Continued)

*Primary Examiner* — Jingge Wu
(74) *Attorney, Agent, or Firm* — TraskBritt (57) ABSTRACT

An X-ray inspection system includes at least one display monitor and a console. The console includes at least two different visualization algorithms and a processor. The processor is configured to process volumetric image data with a first of the at least two different visualization algorithms and produce a first processed volumetric image. The processor is further configured to process the volumetric image data with a second of the at least two different visualization algorithms and produce a second processed volumetric image. The processor is further configured to concurrently display the first and second processed volumetric image data via the display monitor. The volumetric image data is indicative of a scanned object and items therein.

20 Claims, 8 Drawing Sheets

(56) References Cited

U.S. PATENT DOCUMENTS

| | | | |
|---|---|---|---|
| 2007/0168467 A1* | 7/2007 | Hu | G06Q 10/08 709/219 |
| 2007/0247647 A1* | 10/2007 | Pettigrew | G06T 11/001 358/1.9 |
| 2008/0151047 A1* | 6/2008 | Bendall | H04N 5/232 348/135 |
| 2008/0170660 A1* | 7/2008 | Gudmundson | G06K 9/6255 378/57 |
| 2009/0034790 A1* | 2/2009 | Song | G06T 7/0002 382/103 |
| 2009/0174729 A1* | 7/2009 | Matsumoto | G06T 15/06 345/619 |
| 2009/0238335 A1* | 9/2009 | Ripp | A45C 13/02 378/57 |
| 2010/0046704 A1* | 2/2010 | Song | G01N 23/04 378/57 |
| 2010/0215144 A1* | 8/2010 | Basu | G01V 5/005 378/20 |
| 2010/0235111 A1* | 9/2010 | Sharp | G06Q 10/04 702/35 |
| 2010/0235112 A1* | 9/2010 | Kesler | G06Q 10/04 702/35 |
| 2011/0085718 A1* | 4/2011 | Ingerman | G01N 23/046 382/131 |
| 2011/0222647 A1* | 9/2011 | Sugita | G01N 23/046 378/8 |
| 2011/0227910 A1* | 9/2011 | Ying | A61B 6/032 345/419 |
| 2014/0133718 A1* | 5/2014 | Holt | G06K 9/00624 382/131 |
| 2015/0022522 A1* | 1/2015 | Li | G06T 19/00 345/424 |
| 2015/0248197 A1* | 9/2015 | Peters | A61B 6/463 715/838 |
| 2016/0005218 A1* | 1/2016 | Day | G06T 15/08 345/426 |
| 2018/0130236 A1* | 5/2018 | He | A61B 5/7203 |

* cited by examiner

MULTIPLE THREE-DIMENSIONAL (3-D) INSPECTION RENDERINGS

TECHNICAL FIELD

The following generally relates to an imaging inspection system and more particularly to multiple simultaneous three-dimensional (3-D) inspection renderings of the imaging inspection system.

BACKGROUND

A computed tomography (CT) imaging inspection system has been used in the detection of contraband such as explosives, and/or other prohibited items at an airport security checkpoint and/or other location. Such an imaging inspection system generates three-dimensional (3-D) volumetric image data of the scanned luggage and/or baggage and items therein. The identification of the contraband may then be made by a combination of image processing of the volumetric image data with an inspection software and visual inspection of the displayed volumetric image data by inspection personnel.

A CT imaging inspection system for checked luggage and/or baggage has only provided a single whole volume 3D image for display, typically shown with high transparency. Unfortunately, it may be difficult or not possible to discern what an item is when displaying the item semi-transparently, as the perimeter and/or exterior of the item may not be clear or visible. For carry-on luggage and/or baggage, the displayed image has been a two-dimensional (2-D) projection image(s), such as one or both of a top view 2-D image and a side view 2-D image. The 2-D image(s) has been displayed in gray-scale and/or color.

Figure 1:
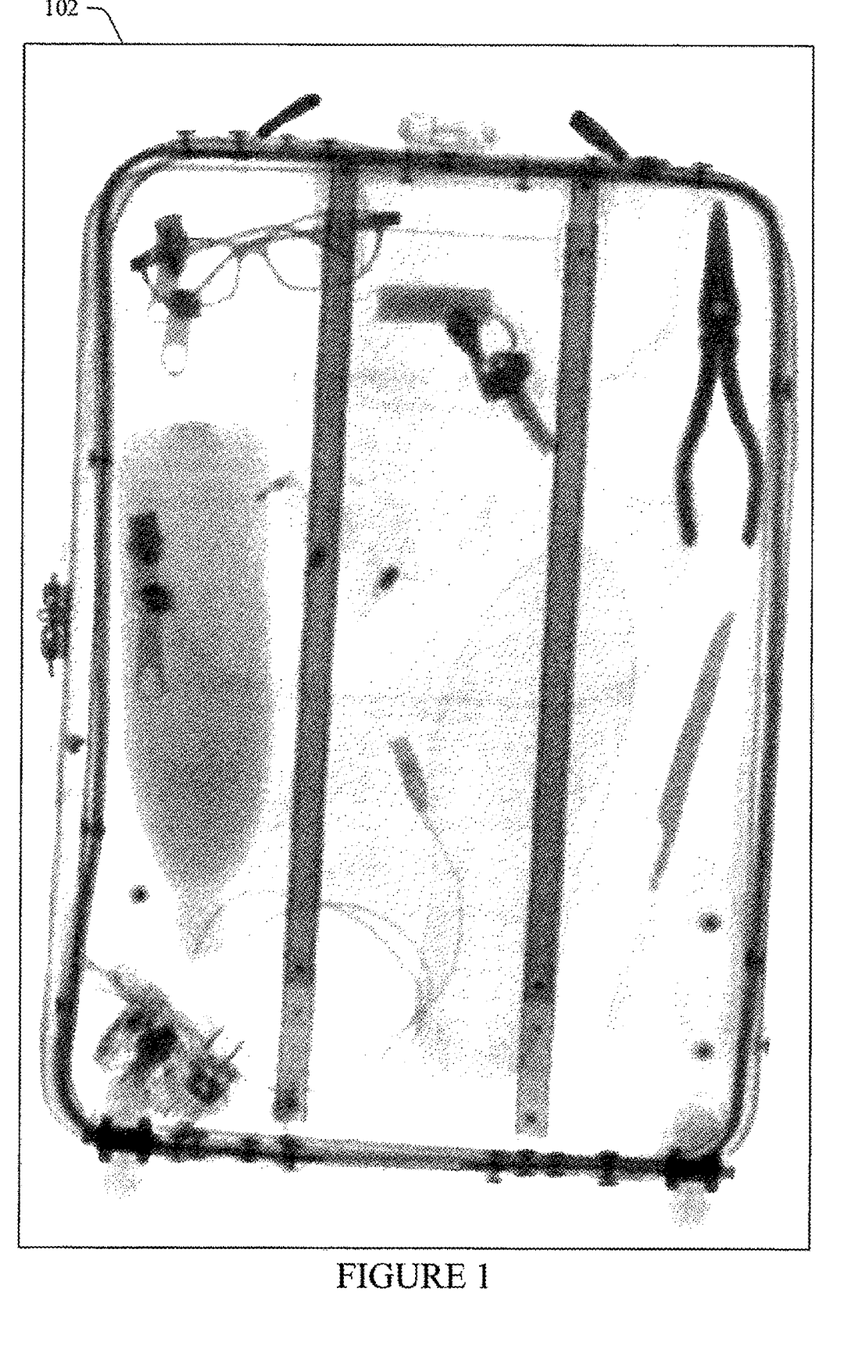
FIG. 1 shows an example a gray-scale 2-D image of carry-on luggage.

FIG. 1 shows an example of a gray-scale 2-D image 102 of carry-on luggage and/or baggage. Unfortunately, contraband may not be visibly apparent and/or discernible in a 2-D image(s) such as the 2-D image 102. For example, the representation of a first item may obscure the representation of another item located below the first item. As a consequence, certain contraband may not be detected or detectable through visual inspection of the 2-D image(s). In such a case, visual inspection may offer only limited utility when used in combination with a computer inspection algorithm(s).

SUMMARY

Aspects of the application address the above matters, and others.

In one aspect, an X-ray inspection system includes at least one display monitor and a console. The console includes at least two different visualization algorithms and a processor. The processor is configured to process volumetric image data with a first of the at least two different visualization algorithms and produce first processed volumetric image. The processor is further configured to process the volumetric image data with the a second of the at least two different visualization algorithms and produce second processed volumetric image. The processor is further configured to concurrently display the first and second processed volumetric image data via the display monitor. The volumetric image data is indicative of a scanned object and items therein.

In another aspect, a method includes receiving volumetric image data indicative of a scanned object and items therein from an imaging inspection system. The method further includes processing the volumetric image data with a first visualization algorithm, producing a first processed volumetric image. The method further includes processing the volumetric image data with a second visualization algorithm, producing second processed volumetric image. The method further includes simultaneously displaying the first processed volumetric image and the second processed volumetric image.

In another aspect, a computer readable medium is encoded with computer-executable instructions which when executed by a processor causes the processor to: process volumetric image data generated by an imaging inspection system with a first visualization algorithm, producing first processed volumetric image, process the volumetric image data with a second visualization algorithm, producing second processed volumetric image, and display both the first processed volumetric image and the second processed volumetric image.

Those skilled in the art will recognize still other aspects of the present application upon reading and understanding the attached description.

BRIEF DESCRIPTION OF THE DRAWINGS

The application is illustrated by way of example and not limited by the figures of the accompanying drawings, in which like references indicate similar elements and in which.

DETAILED DESCRIPTION

Figure 2:
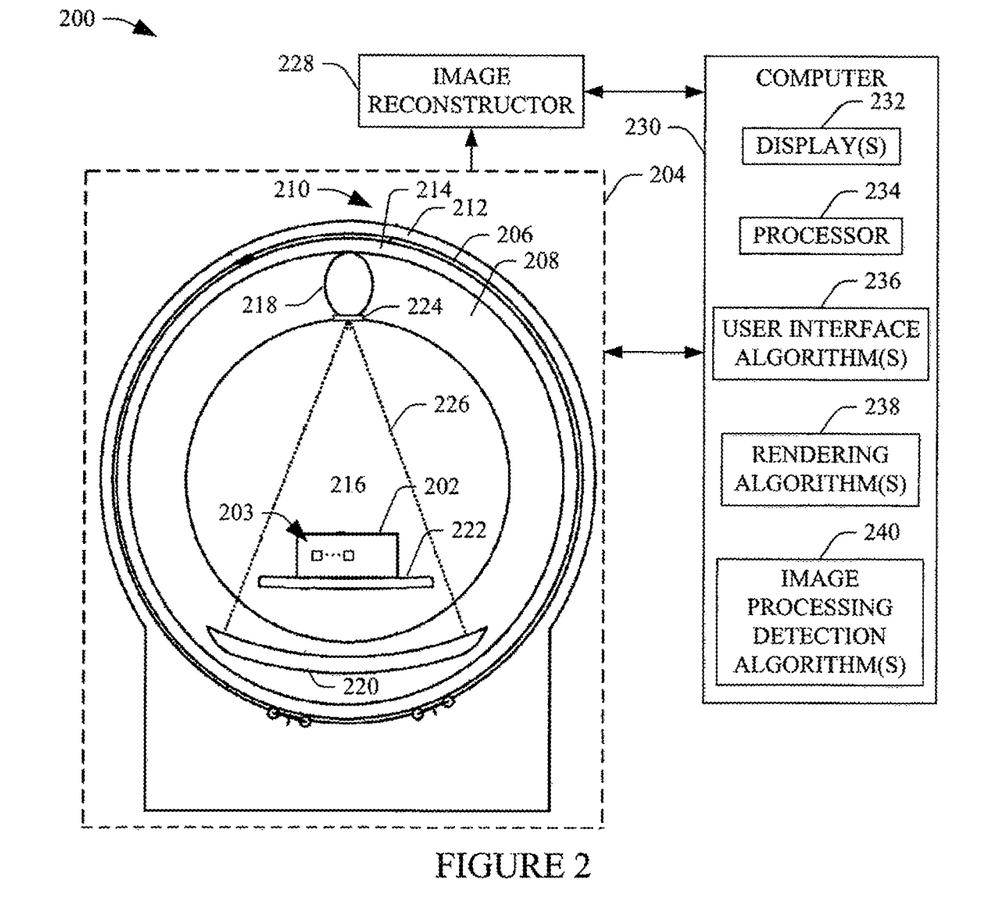
FIG. 2 schematically illustrates an example imaging inspection system.

FIG. 2 schematically illustrates an example imaging inspection system 200. The illustrated imaging inspection system 200 is configured to scan an object 202 (e.g., luggage, baggage, etc.) and items 203 therein, and detect contraband items, such as explosives, and/or other prohibited items of the items 203. The imaging inspection system 200, in one instance, is an aviation security and/or inspection computed tomography (CT) based imaging inspection system at an airport checkpoint and/or other location. In another instance, the imaging inspection system 200 is configured for non-destructive testing, medical, and/or other imaging.

The illustrated imaging inspection system 200 includes a stationary frame 204 with an aperture 206 and a rotating frame 208. The rotating frame 208 is rotatably supported in the aperture via a bearing 210, which includes a first portion 212 affixed to the stationary frame 204 and a second portion 214 affixed to the rotating frame 208. The rotating frame 208 rotates about an examination region 216. The rotating frame 208 supports a radiation source(s) 218 (e.g., an ionizing X-ray source, etc.) and a detector array 220, which is disposed diametrically opposite the radiation source(s) 218, across the examination region 216. A conveyor assembly 222 supports the object 202 in the examination region 216, including moving the object through the examination region 216.

Figure 3:
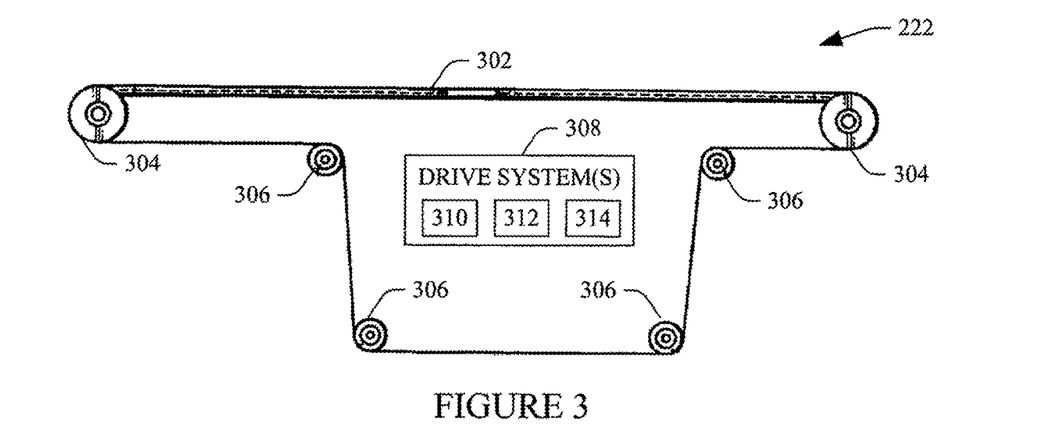
FIG. 3 schematically illustrates an example conveyor assembly for the imaging inspection system.

Briefly turning to FIG. 3, an example of a side view of a portion of a suitable conveyor assembly 222 is illustrated. In FIG. 3, the conveyor assembly 222 includes a continuous belt 302 supported by two opposing pulleys 304 and four idler pulleys 306. The conveyor assembly 222 further includes a drive system(s) 308, which include at least a controller 310, which controls a motor 312 to drive an actuator 314 (e.g., a belt, a gear, a ball screw, a lead screw, etc.) to rotate one or more of the pulleys 304 and/or 306 to translate the belt 302. An example of a suitable conveyor assembly 22 is described in U.S. Pat. No. 7,072,434, filed Jan. 15, 2044, and entitled "Carry-on baggage tomography scanning system," the entirety of which is incorporated herein by reference.

Returning to FIG. 2, during an examination of the object(s) 202, the radiation source(s) 218 emits radiation, which is collimated, e.g., via a collimator 224, to produce a fan, cone, wedge, and/or other shaped radiation beam 226, which traverses the examination region 216, including the object 202 and items 203, which attenuate or absorb radiation based on, e.g., a material composition and/or density of the object 202 and items 203. The detector array 220 includes a 1-D or 2-D array of detectors, which detect the radiation and generates an electrical signal(s) (projection data) indicative of an attenuation by the object 202 and items 203. An image reconstructor 228 reconstructs the electrical signal(s), generating volumetric image data indicative of the object 202 and the items 203.

A computer 230 is configured to provide a signal(s) that controls components such as the rotating frame 208, the radiation source 218, the detector array 220 and the conveyor assembly 222 for scanning, the image reconstructor 228 for generating the volumetric image data, and to receive the volumetric image data from the image reconstructor 228 and process and display the volumetric image data via a display monitor(s) 232, which can be part of and/or in electrical communication with the computer 230. The computer 230 is also configured with an input device(s) to receive user input, which controls an operation(s) such as a speed of gantry rotation, kVp, mA, etc.

The computer 230 includes a processor 234 (e.g., a microprocessor, a central processing unit, a controller, etc.) and a user interface algorithm(s) 236. The processor 230 executes the user interface algorithm(s) 236 and generates a user interface(s), which is displayed with the display monitor(s) 232. In one instance, the user interface is a graphical user interface (GUI) with a single view port to display a 3-D image. In another instance, the GUI includes two view ports for concurrent and/or simultaneous display of two different 3-D images. In yet another instance, the GUI includes N (N>2) view ports to display N images, one in each view port.

The computer 230 further includes a visualization or rendering algorithm(s) 238. As described in greater detail below, in one instance, the rendering algorithm(s) 238 includes at least two different algorithms for generating at least two different 3-D images of the object 202 and the items 203 emphasizing different characteristics (e.g., material composition, surface, etc.) of the object 202 and the items 203, and the processor 234 concurrently and/or simultaneously displays the at least two different 3-D images in different view ports of the display monitor(s) 232. In one instance, concurrent and/or simultaneous display of the at least two 3-D images allow a user to more quickly and accurately identify the items 203, relative to a configuration in which only a single rendering algorithm 238 is utilized, e.g., by showing a more complete representation of identify the items, simultaneously, which, in one instance, can speed up and/or improve the inspection process, e.g., for clearing threats.

The computer 230 further includes an image processing detection algorithm(s) 240. The processor 234 executes the image processing detection algorithm(s) 240 to process the volumetric image data and identify contraband in the object 202 therefrom. Non-limiting examples of detection algorithms include, but are not limited to, U.S. Pat. No. 7,190,757 B2, filed May 21, 2004, and entitled "Method of and system for computing effective atomic number images in multi-energy computed tomography," U.S. Pat. No. 7,302,083 B2, filed Jul. 1, 2004, and entitled "Method of and system for sharp object detection using computed tomography images," and U.S. Pat. No. 8,787,669 B2, filed Sep. 30, 2008, and entitled "Compound object separation," all of which are incorporated herein by reference in their entireties.

It will be appreciated that the example component diagram is merely intended to illustrate an embodiment of a type of imaging modality and is not intended to be interpreted in a limiting manner. For example, the functions of one or more components described herein may be separated into a plurality of components and/or the functions of two or more components described herein may be consolidated into merely a single component. Moreover, the imaging modality may comprise additional components to perform additional features, functions, etc.

Figure 4:
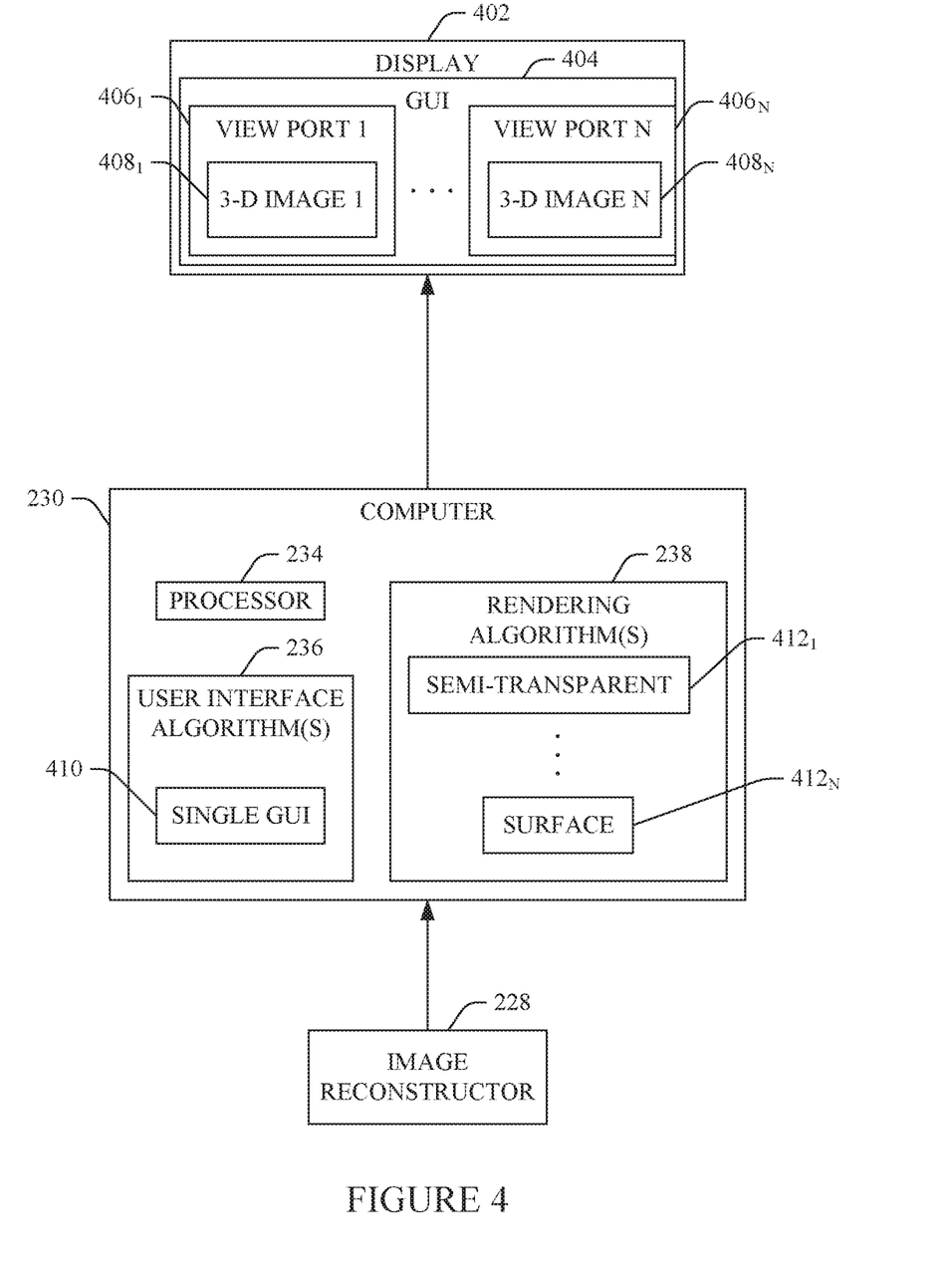
FIG. 4 schematically illustrates an example imaging inspection system with a single display monitor visually presenting multiple differently processed 3-D images.

FIG. 4 illustrates an example in which the displays 232 include a single display 402.

The user interface algorithm(s) 236 includes at least an algorithm 410 for generating a single GUI 404, with at least two view ports $406_1, \ldots, 406_N$ (where N is an integer equal to or greater than two), rendered in the single display 402. Each at least two view ports $406_1, \ldots, 406_N$ displays a 3-D image, $408_1, \ldots, 408_N$. Each 3-D image $408_1, \ldots, 408_N$ is displayed from a vantage point of a view plane through the 3-D image and into a remaining depth of the 3-D image, wherein the portion of the 3-D image in front of the view plane is either rendering transparent or not at all.

The rendering algorithm(s) 238 includes at least a first algorithm $412_1$ for a generating semi-transparent 3-D rendering and an m-th algorithm $412_N$ for generating a surface 3-D rendering. A suitable semi-transparent rendering uses transparency and/or colors to represent the object 202 as a semi-transparent volume. For example, the outside of the object 202 and/or one or more of the items 203 is displayed as semi-transparent so that it does not visually conceal other items 203 there behind. A suitable surface rendering algorithm uses a threshold value of radiodensity (to see through the outer cloth but detect items of interest inside) and edge detection to detect surfaces of the items 203 in the object 202, where only the surface closest to the user (the view plane) is visible.

In one instance, having at least shape recognition from the surface rendering and the semi-transparent rendering can speed up the process for clearing threats since each rendering visually displays the items 203 of the object 202 differently. For example, the semi-transparent rendering can facilitate quick identification of an item as an item of interest and the surface rendering can facilitate identifying what these items are. The multiple renderings in the view ports $406_1, \ldots, 406_N$ can be manipulated independently or synchronously to a single user action for operations such as zoom, rotate, pan, contrast, brightness, opacity and/or other operation. Manipulating both in synchronization may reduce user interaction and optimize workflow. The manipulation can be performed via a mouse, keyboard, and/or touchscreen, e.g., using both single and multi-touch gestures.

Figure 5:
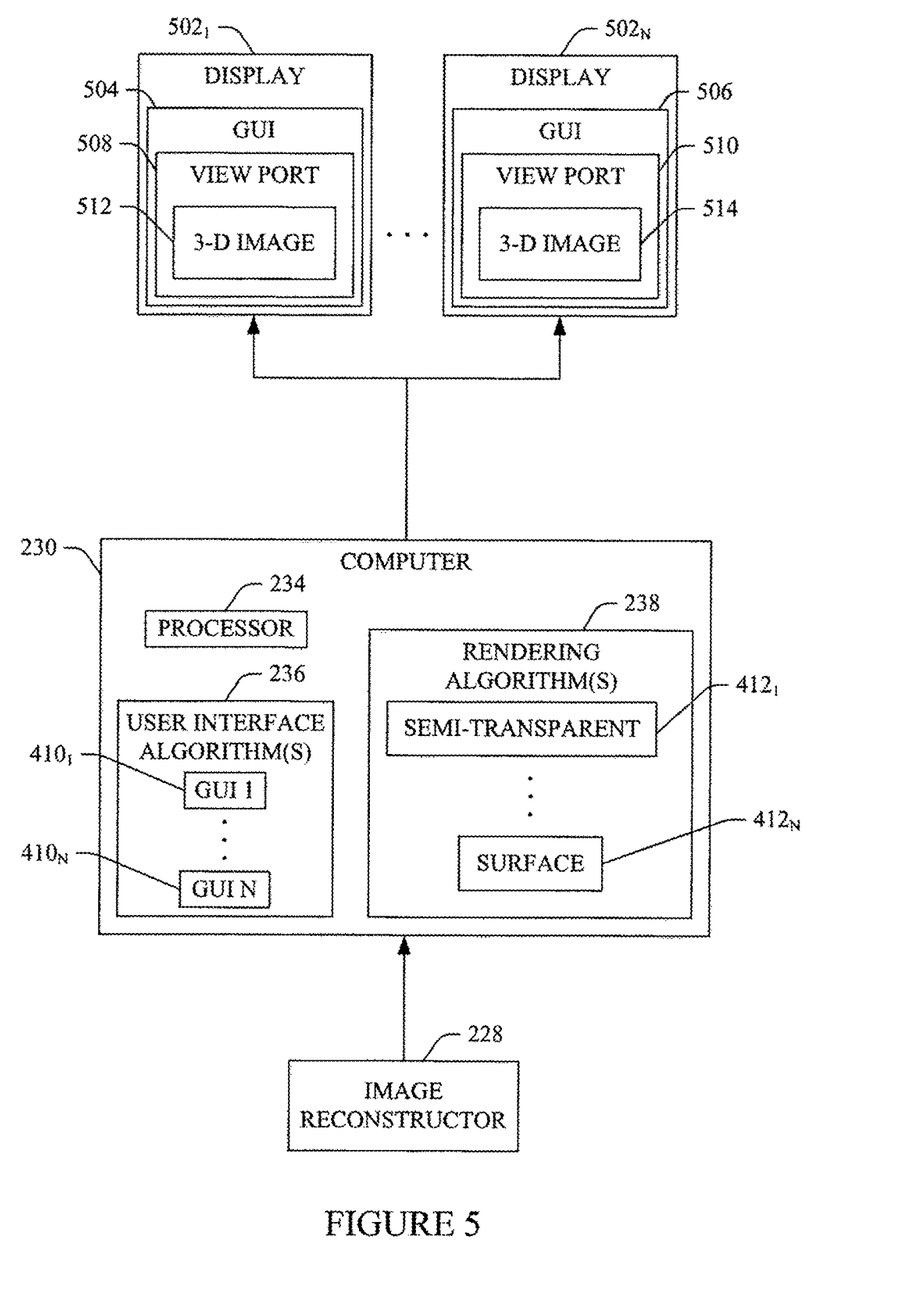
FIG. 5 schematically illustrates an example imaging inspection system with multiple display monitors, each visually presenting a differently processed 3-D image.

FIG. 5 illustrates a variation in which the displays 232 includes at least two displays $502_1, \ldots, 502_N$, and the user interface algorithm(s) 236 includes at least two algorithms $410_1, \ldots, 410_N$, for generating at least two GUIs 504 and 506, one in each of the displays $502_1, \ldots, 502_N$, and each respectively visually presenting at least one view port 508 and 510, each respectively displaying a 3-D image 512 and 514 generated with different algorithms of the rendering algorithm(s) 238.

In another variation, the embodiment of FIGS. 4 and 5 are combined, e.g., for an embodiment which includes more than one display 232, where at least one of the displays 232 visually presents a GUI with multiple view ports that display views of volumetric image data processed using different rendering algorithms of the rendering algorithms 238. In one instance, all of the displays 232 include multiple view ports. In another instance, at least one of the displays includes only a single view port.

Figure 6:
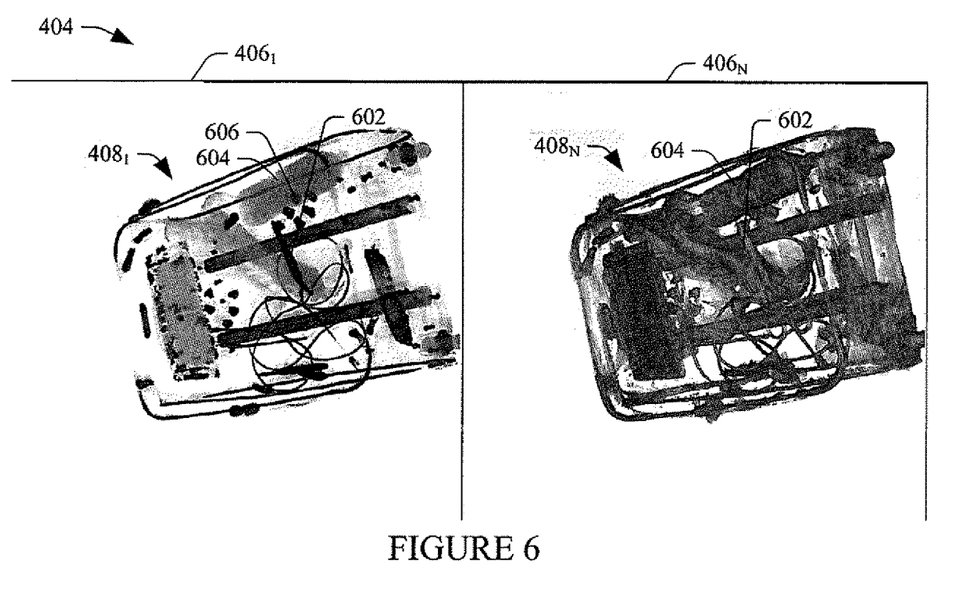
FIG. 6 schematically illustrates a first example of two differently processed 3-D images with contraband.

FIG. 6 shows the single GUI 404 with the two view ports $406_1, \ldots, 406_N$.

The view port $406_1$ presents the 3-D image $408_1$ generated with the semi-transparent algorithm $412_1$, and the view port $406_N$ presents the 3-D image $408_N$ generated with the surface algorithm $412_N$. In this example, each of the algorithms $412_1, \ldots, 412_N$ includes a color lookup table (LUT) that maps each voxel in the volumetric image data to a specific color in the Hue/Saturation/Value (HSV) color model and/or gray value, e.g., in a gray scale range, and an opacity table that maps each voxel to a specific transparency. The LUT and/or opacity is different for each algorithm $412_1, \ldots, 412_N$. One or both of the algorithms $412_1, \ldots, 412_N$ also provide shading.

In this example, the items 203 include at least a pair of scissors 602 and a container 604 filled with a fluid, where the simultaneous observation makes it easier to locate the pair of scissors 602 and container 604. For example, the 3-D image $408_1$ makes it easier to locate metallic items such as the pair of scissors 602 and containers holding fluids, at least since different material compositions are different colored and items behind items are visible, but not necessarily identify what those items 203 are, and the 3-D image $408_N$ makes it easier to identify what those items 203 are—a pair of scissors and a container—but not with discerning those particular items within all of the other items 203 at least since all of the surface are similarly represented in gray scale.

Figure 13:
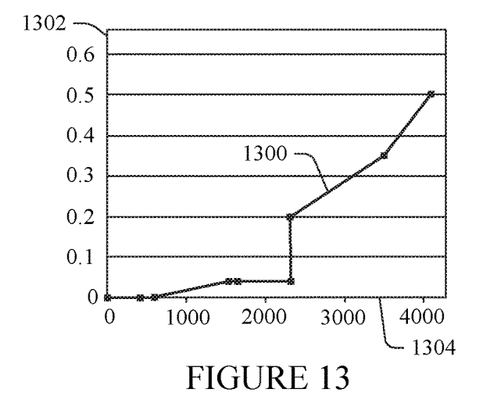
FIG. 13 shows an example first plot for a first opacity mapping for a first visualization algorithm for a first of the two differently processed 3-D images.

In this example, the semi-transparent algorithm $412_1$ provides a traditional rendering for security imaging where materials are shown using standard industry defined colors with standard industry defined transparency levels that allows a user to see through or inside the object 202 and/or the items 203 therein, which may facilitate finding concealed items. For instance, outer cloth of the object 202 is shown virtually completely transparent, the container 604 is shown semi-transparent and with one color where an item 606 can be seen there through, and the pair of scissors 602 is shown virtually non-transparent and with a different color, since the material composition (e.g., metal vs plastic) of the container and the scissors is different. The transparency level, in general, corresponds to the material composition, and can vary across the items 203, with items less likely to be contraband rendered more transparent. Shading is not used. An example opacity mapping 1300 for the semi-transparent algorithm $412_1$ is shown in FIG. 13, where a first axis 1302 represents opacity and a second axis 1304 represents CT number (e.g., in Hounsfield units).

Figure 14:
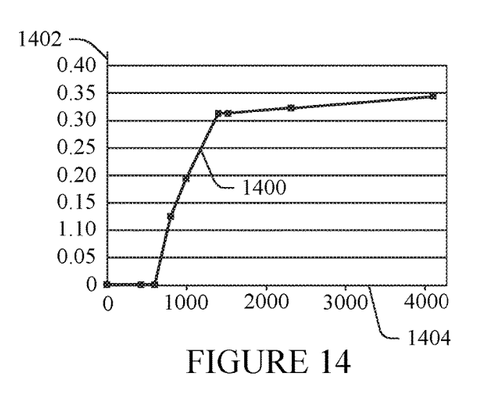
FIG. 14 shows an example second plot for a second opacity mapping for a second visualization algorithm for a second of the two differently processed 3-D images.

In contrast, the surface algorithm $412_N$ instead utilizes a different LUT and a different opacity table, (e.g., with lower transparency levels, e.g., opaque) for showing surfaces of the items 203, which will more closely visually match a physical outer appearance of the items 203. For example, the outer cloth of the object 202 is likewise shown virtually completely transparent, e.g., due to thresholding. However, the surface of the container 604 is shown opaque such that the inside of the container 604 is not visible and neither is the item 606 behind the container 604. Likewise, the surface of the pair of scissors 602 is shown opaque such items there behind are not visible. The items 203 are all shown using gray scale levels with shading representing depth. Generally, items 203 behind surfaces of other items 203 in the view plane are not visible through the surfaces in the view. An example surface rendering algorithm is ray casting, which locates a ray-surface intersection in the volumetric data. An example opacity mapping 1400 for the surface algorithm $412_N$ is shown in FIG. 14, where a first axis 1402 represents opacity and a second axis 1404 represents CT number (e.g., in Hounsfield units).

Figure 7:
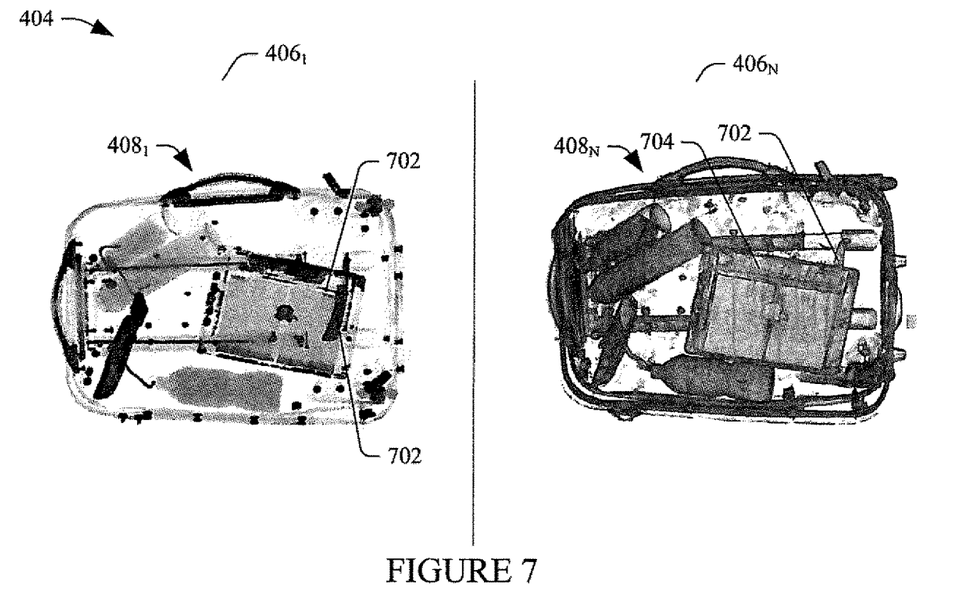
FIG. 7 schematically illustrates another example of two differently processed 3-D images with contraband.

FIG. 7 shows another example with the GUI 404 with the two view ports $406_1, \ldots, 406_N$. In this example, the items 203 include at least a knife 702, where the simultaneous observation makes it easier to locate and identify the knife 702. For example, the 3-D image $408_1$ makes it easier to locate a metallic item such as the knife 702, but not clearly identify what that metallic item is at least since parts of it are almost completely transparent and other parts of it are concealed by combined with other items, and the 3-D image $408_N$ makes it easier to identify what the metallic item is—the knife 702 at least since the blade is more apparent, but not clearly locate the item at least since it is mostly visually obstructed by another item 704 in front of it.

Figure 8:
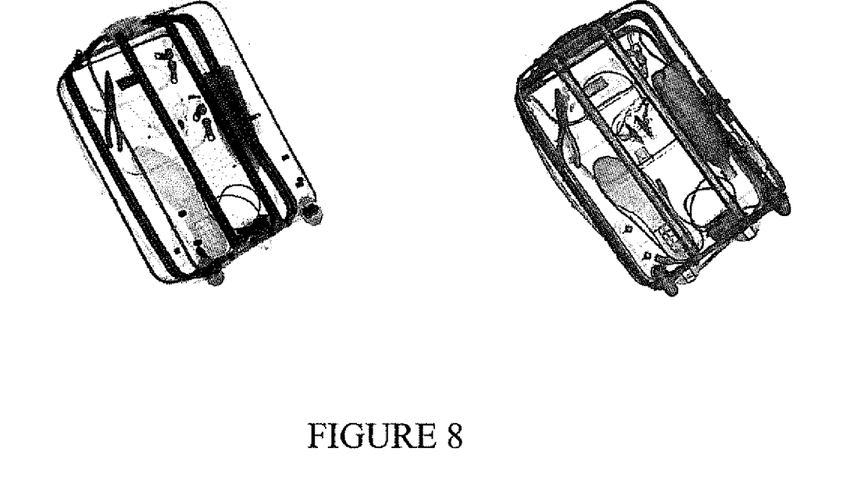
FIG. 8 schematically illustrates yet another example of two differently processed 3-D images.
Figure 9:
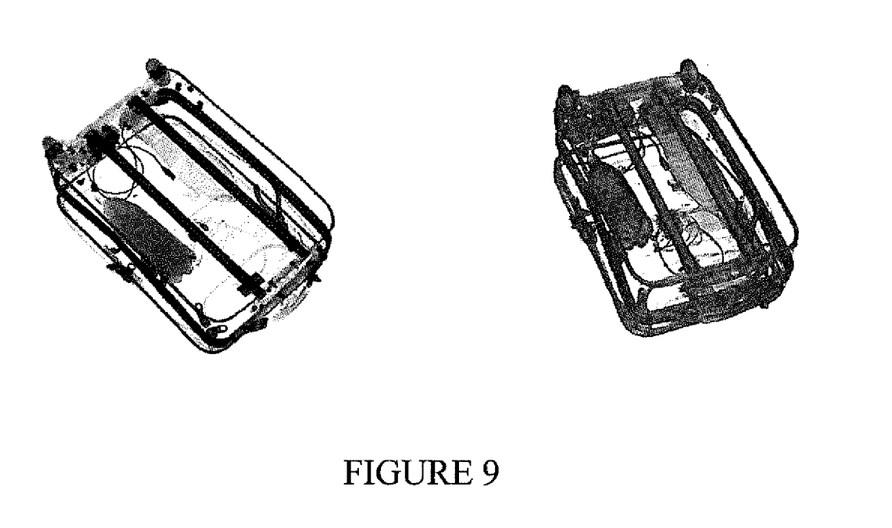
FIG. 9 schematically illustrates the two differently processed 3-D images of FIG. 8 synchronously rotated.

FIGS. 8 and 9 show another a GUI with the two view ports. In this example, the GUI is configured so that at least a rotation tool synchronously rotates the 3-D images in both view ports such that rotating (e.g., via a mouse, keyboard, touchscreen, etc.) the volumetric image data in either of the view ports automatically causes the volumetric image data in the other view port to similarly rotate.

Figure 10:
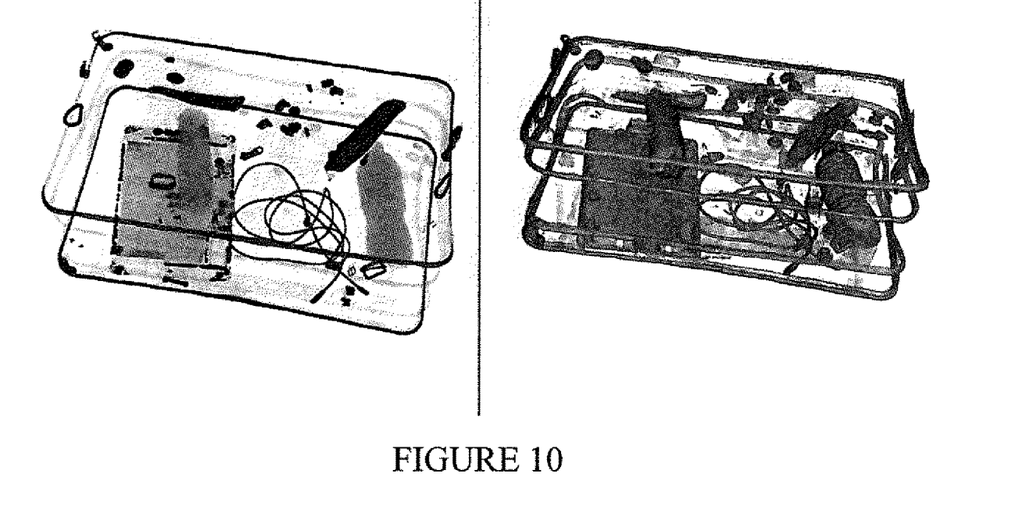
FIG. 10 schematically illustrates still another example of two differently processed 3-D images.
Figure 11:
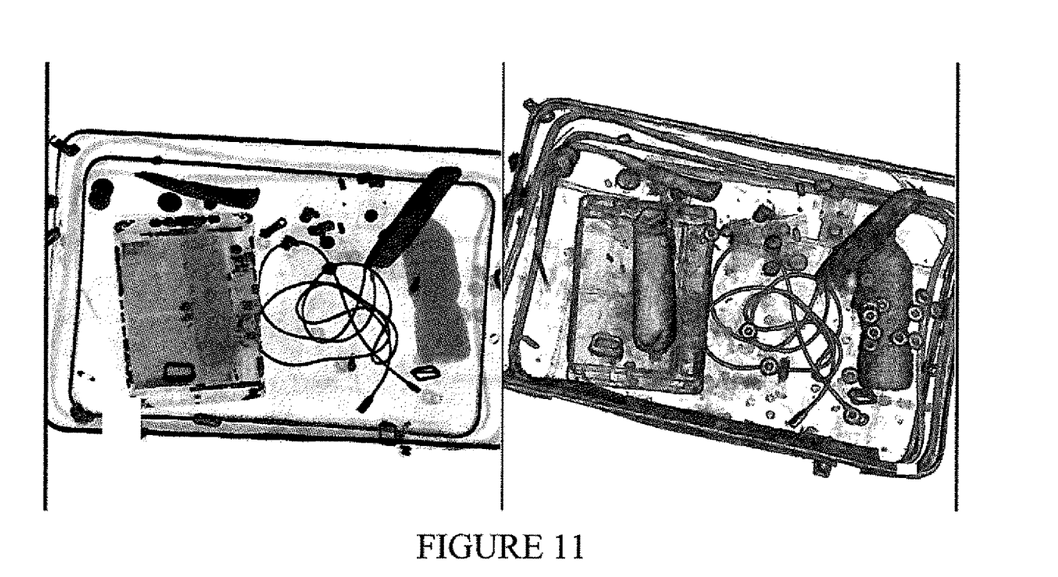
FIG. 11 schematically illustrates the two differently processed 3-D images of FIG. 10 synchronously rotated and zoomed.

FIGS. 10 and 11 show another a GUI with the two view ports. In this example, the GUI is configured so that at least a zoom tool synchronously zooms the 3-D images in both view ports such that zooming (e.g., via a mouse, keyboard, touchscreen, etc.) the volumetric image data in either of the view ports automatically causes the volumetric image data in the other view port to similarly zoom.

As described herein, in one instance, a screen layout provides for a dual 3-D image display of volumetric image data side-by-side on screen, where one displayed 3-D volume provides a semi-transparent rendering for seeing inside and through objects, and the other displayed 3-D volume provides a surface rendering for seeing shapes and contours of items 203 inside the object 202. The semi-transparent image provides the operator with the sense of layers, which can be added or removed through adjustment in opacity, whereas the surface rendered display gives the operator information of the surface structure.

Figure 12:
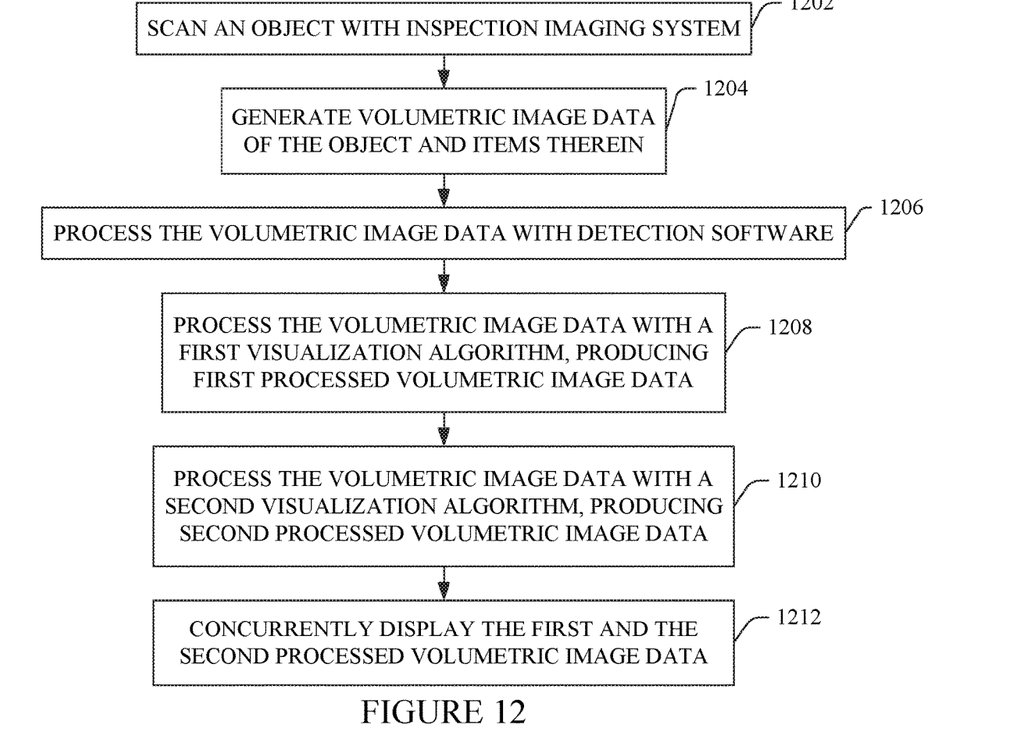
FIG. 12 schematically illustrates an example method in accordance with an embodiment described herein.

FIG. 12 illustrates an example method.

It is to be understood that the following acts are provided for explanatory purposes and are not limiting. As such, one or more of the acts may be omitted, one or more acts may be added, one or more acts may occur in a different order (including simultaneously with another act), etc.

At 1202, an object is scanned with the imaging inspection system 200, producing view data.

At 1204, the view data is reconstructed, producing volumetric image data of the object.

At 1206, the volumetric image data is processed with detection software for computerized detection of contraband in the items 203.

At 1208, a first visualization algorithm is applied to the volumetric image data, producing first processed volumetric image data, as described herein and/or otherwise.

At 1210, a second different visualization algorithm is applied to the volumetric image data, producing second different processed volumetric image data, as described herein and/or otherwise.

At 1212, the first and the second volumetric image data are concurrently displayed, as described herein and/or otherwise.

The methods described herein may be implemented via one or more processors executing one or more computer readable instructions encoded or embodied on computer-readable storage medium which causes the one or more processors to carry out the various acts and/or other functions and/or acts. Additionally or alternatively, the one or more processors can execute instructions carried by transitory medium such as a signal or carrier wave.

The application has been described with reference to various embodiments. Modifications and alterations will occur to others upon reading the application. It is intended that the invention be construed as including all such modifications and alterations, including insofar as they come within the scope of the appended claims and the equivalents thereof.

What is claimed is:

1. An X-ray inspection system, comprising:
   at least one display monitor;
   a console, including:
      at least two different visualization algorithms; and
      a processor configured to:
         process volumetric image data with a volume rendering algorithm of the at least two different visualization algorithms to produce a first processed volumetric image including a volume rendering;
         process the volumetric image data with a surface rendering algorithm of the at least two different visualization algorithms to produce a second processed volumetric image including a surface rendering, the second processed volumetric image unprocessed by the volume rendering algorithm, and the first processed volumetric image unprocessed by the surface rendering algorithm; and
         concurrently display the first processed volumetric image including the volume rendering and the second processed volumetric image including the surface rendering via the display monitor, wherein the volumetric image data is indicative of a scanned object and items therein.

2. The X-ray inspection system of claim 1, wherein the volume rendering algorithm includes a first color lookup table and opacity table pair and the surface rendering algorithm includes a second color lookup table and opacity table pair, wherein the first color lookup table and opacity table pair is different from the second color lookup table and opacity table pair.

3. The X-ray inspection system of claim 2, wherein the first color lookup table and opacity table pair assigns a color and a transparency level to a voxel of the first processed volumetric image based on a material composition represented by the voxel.

4. The X-ray inspection system of claim 3, wherein the first color lookup table and opacity table pair assigns a first color and a first transparency level to a first voxel of the first processed volumetric image and a second different color and a second different transparency level to a second different voxel of the first processed volumetric image where the first and second voxels represent different material compositions.

5. The X-ray inspection system of claim 4, wherein at least one of the first or second transparency levels renders at least one of the first or second voxels semi-transparent, and voxels located behind the at least one of the first or second voxels are visible through the at least one of the first or second semi-transparent voxels in the displayed first processed volumetric image.

6. The X-ray inspection system of claim 3, wherein the second color lookup table and opacity table pair assigns a color and transparency level to a voxel of the second processed volumetric image representing a surface of an item, which renders the voxel opaque.

7. The X-ray inspection system of claim 6, wherein the second color lookup table and opacity table pair assigns different shading to voxels representing the surface of the item as a function of depth from a view plane of the display monitor into the second processed volumetric image.

8. The X-ray inspection system of claim 1, wherein the first and second processed volumetric images are rendered side-by-side.

9. The X-ray inspection system of claim 1, further including:
   a rotating frame;
   a radiation source disposed on the rotating frame;
   a detector array disposed opposite the radiation source on the rotating frame, across an examination region; and
   a conveyor belt at least partially in the examination region;
   wherein the radiation source emits radiation while rotating and the detector array detects radiation while rotating, and an image reconstructor generates the volumetric image data from an output of the detector array.

10. The X-ray inspection system of claim 1, wherein the first and second processed volumetric images include voxels representing a contraband item in the scanned object.

11. A method, comprising:
receiving volumetric image data indicative of a scanned object and items therein from an imaging inspection system;
processing, via the imaging inspection system, the volumetric image data with a volume rendering algorithm, producing a first processed volumetric image including a volume rendering;
processing, via the imaging inspection system, the volumetric image data with a surface rendering algorithm, producing a second processed volumetric image including a surface rendering, the second processed volumetric image unprocessed by the volume rendering algorithm, and the first processed volumetric image unprocessed by the surface rendering algorithm; and
simultaneously displaying the first processed volumetric image including the volume rendering and the second processed volumetric image including the surface rendering.

12. The method of claim 11, wherein the first processed volumetric image and the second processed volumetric image are displayed in view ports of a same display monitor.

13. The method of claim 11, wherein the first processed volumetric image is displayed in a first view port in a first display monitor, and the second processed volumetric image is displayed in a second view port in a second different display monitor.

14. The method of claim 11, further comprising:
receiving a user input for at least one of rotating, zooming and panning one of the first and second processed volumetric images; and
rotating, zooming and panning both of the first and second processed volumetric images in synchronization in response thereto.

15. The method of claim 11, further comprising:
receiving a user input for at least one of rotating, zooming and panning one of the first and second processed volumetric images; and
rotating, zooming and panning only the one of the first and second processed volumetric images in response thereto.

16. The method of claim 11, further comprising:
receiving a user input indicative of at least a contrast, a brightness and an opacity level of one of the first and second processed volumetric images; and
setting at least one of the contrast, the brightness and the opacity level of both of the first and second processed volumetric images in synchronization in response thereto.

17. The method of claim 11, further comprising:
receiving a user input indicative of at least a contrast, a brightness and an opacity level of one of the first and second processed volumetric images; and
setting at least one of the contrast, the brightness and the opacity level of only the one of the first and second processed volumetric images in response thereto.

18. The method of claim 11, wherein the volume rendering algorithm renders voxels of the first processed volumetric image semi-transparent, wherein a degree of transparency is based on a material composition of an item represented by a voxel.

19. The method of claim 18, wherein the surface rendering algorithm renders voxels of the second processed volumetric image representing surfaces of item in the scanned object opaque.

20. A non-transitory computer-readable medium encoded with computer-executable instructions that, when executed by a processor, causes the processor to:
process volumetric image data generated by an imaging inspection system with volume rendering algorithm of the imaging inspection system, producing a first processed volumetric image including a volume rendering;
process the volumetric image data with a surface rendering algorithm of the imaging inspection system, producing a second processed volumetric image including a surface rendering, the second processed volumetric image unprocessed by the volume rendering algorithm, and the first processed volumetric image unprocessed by the surface rendering algorithm; and
concurrently display both the first processed volumetric image including the volume rendering and the second processed volumetric image including the surface rendering.

* * * * *